Figure 1:
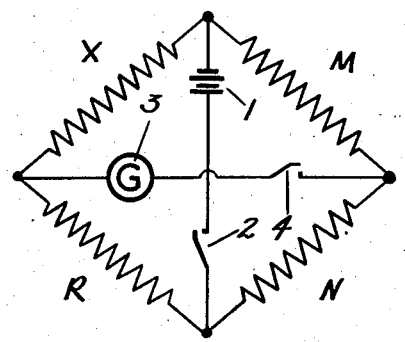

Jan. 17, 1939.    F. H. BROOME    2,144,216
EDUCATIONAL APPARATUS
Filed May 15, 1937

Inventor
Frank H. Broome
By *[signature]*
Attorney

Patented Jan. 17, 1939

2,144,216

UNITED STATES PATENT OFFICE 2,144,216

EDUCATIONAL APPARATUS

Frank H. Broome, Pompton Lakes, N. J., assignor to Cambosco Scientific Company, Boston, Mass., a corporation of Massachusetts Application May 15, 1937, Serial No. 142,793

6 Claims. (Cl. 35—19)

The present invention relates to educational apparatus and especially to Wheatstone bridge apparatus for educational purposes.

The Wheatstone bridge is a well known circuit arrangement used for the measurement of electrical resistance. Such a circuit employs two parallelly-connected groups of resistances. Each group contains two resistances in series. One of the four resistances is the unknown resistance which it is desired to measure. A battery is connected across the two groups, and a galvanometer by one terminal to the junction of the two resistances in one group and by the other terminal to the junction of the two resistances in the other group. Suitable contacts are also usually provided in the battery and galvanometer circuits so that these circuits need be closed only when measurements are to be taken. In operation the three known resistances are adjusted in such a manner that no current flows through the galvanometer. By a simple proportion the value of the unknown resistance can then be calculated from the values of the known resistances.

For teaching students the principles involved in the Wheatstone bridge and to give them some experience in actually making resistance measurements, it has been customary to employ a wound resistance coil for one of the known resistances and a slide-wire device for the other two known resistances. As will be understood by those skilled in the art, it is not necessary to know the absolute values of the two latter resistances; it is sufficient if their values relative to each other be known. Therefore they may conveniently be termed the "ratio resistances," and they will hereinafter be so designated.

Such a slide-wire device as ordinarily used comprises a board upon which is mounted a single resistance wire one meter in length. Adjacent to the wire or underneath it is a scale, usually of wood, one meter in length and graduated according to the metric system. A slider, arranged to move over the wire, effectively divides the wire into two parts, thus forming the two ratio resistances of the Wheatstone circuit. The connection of the separate known resistance and the unknown resistance to the slide-wire must therefore be made across the two ends of the slide-wire, which necessitates the use of long connecting wires. In order to reduce the length of the necessary external wire connections, copper or brass bars are sometimes used, but even these have an appreciable resistance since they total nearly a meter in length and therefore will introduce error in the measurement unless specially compensated for. Such compensation, whether introduced in the apparatus or in the computations, is inconvenient in every case, but it is especially undesirable in educational work for it tends to confuse the student. Furthermore, the long connecting bars add considerably to the weight and bulk of the apparatus.

The slider must be connected to one terminal of either the battery or the galvanometer; usually the latter is chosen. This connection is made by means of a flexible lead which must be long enough to follow the movements of the slider over the entire length of the wire. Such a long lead obviously is inconvenient. Moreover, the contact in the galvanometer circuit, which is used to protect the latter from prolonged excess voltage, is customarily formed as a part of the slider and serves to connect it to the slide-wire. This contact frequently gets out of adjustment. A further disadvantage of the single slide-wire bridge is that one of the ratio resistances cannot be varied without changing the other.

By means of the present invention all the above as well as other disadvantages of the single slide-wire meter-length bridge apparatus commonly used for instructional purposes are entirely avoided. The apparatus according to the present invention moreover, has additional advantages not possessed by the apparatus heretofore used, as will appear from the description given below.

According to the present invention the two ratio resistances, heretofore made in the form of a single slide-wire are made independently variable. Each of these is preferably in the form of two parallelly disposed wires electrically connected by a slider movable along them. These two pairs of parallel wires may be arranged end to end, or preferably parallel to each other whereby an instrument of much shorter length is obtained. In either case all connections can be made at adjacent ends of the two pairs so that only very short connecting leads are required.

Moreover, by using four pairs of wires an electrical slide rule is obtained which can be used for various computations such as multiplication, division, involution and evolution, as well as for the study of voltage and current relations in series and parallel connected resistances of variable lengths.

Figure 2:
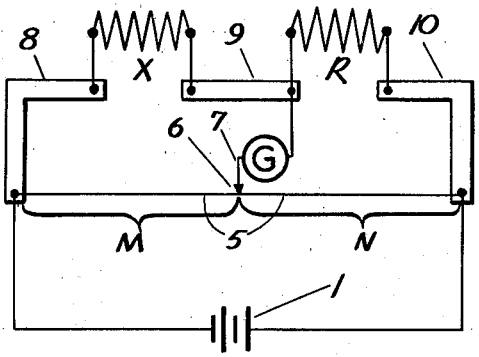
Figure 3:
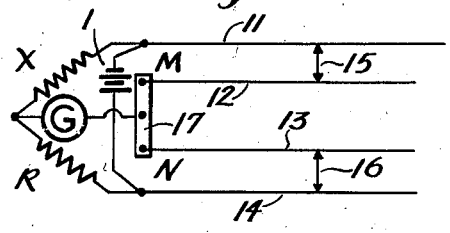
Figure 5:
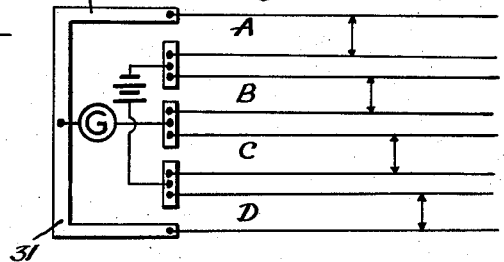
Figure 4:
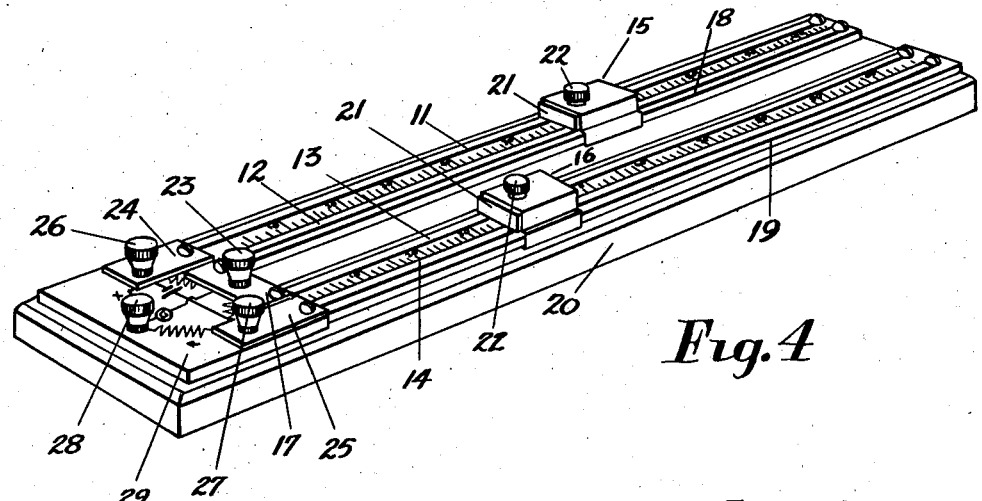

In the accompanying drawing Figure 1 shows the customary diagram of the Wheatstone bridge circuit; Figure 2 is a representation of the single slide-wire type of bridge apparatus heretofore used; Figure 3 is a diagrammatic representation of a bridge apparatus in accordance with the present invention; Figure 4 is a perspective view of the actual apparatus shown diagrammatically in Figure 3; and Figure 5 is a diagrammatic representation of a modification of my invention usable as an electrical slide rule.

The well known Wheatstone bridge circuit shown in Figure 1 does not require much description. X represents the unknown resistance which it is desired to measure. M, N and R are known resistances, although it is sufficient if the ratio between M and N is known. A battery 1 is connected in series with a key 2 between the junctions of X and M, and R and N, respectively. A galvanometer 3 is connected in series with another key 4 between the junctions of X and R, and M and N, respectively. If the resistance values of M, N and R are so adjusted that no current flows through the galvanometer when keys 2 and 4 are depressed, the value of the unknown resistance X can be found from the proportion $X/R=M/N$.

Particularly for educational purposes, as above mentioned, a single slide-wire apparatus is commonly used for Wheatstone bridge measurements. Such a device is diagrammatically shown in Figure 2. The two ratio resistances M and N are here formed by the wire 5, often stretched along a meter stick which forms a convenient scale to indicate the position of the slider. The latter is represented by the arrow 6, and is connected to the galvanometer by a flexible conductor 7, which must be of a length sufficient to permit it to follow the motion of the slider along the whole wire 5. Since the resistance R and X must be connected to the extremities of the wire 5, long leads must be used; even though these are in the form of bars 8, 9 and 10, their resistance introduces errors into the measurement.

According to the present invention, the ratio resistances M and N are each formed by two parallel wires 11, 12, and 13, 14, respectively. The wires of each pair of wires are electrically connected at any desired point by the sliders 15 and 16 respectively. One of the wires of one pair is permanently connected to one of the wires of the other pair, for example, 12 and 13 by the bar 17. The junction is also connected to the galvanometer, as shown. The adjacent extremities of the other two wires, 11 and 14, are connected to the battery 1 and to the resistances X and R as shown. The opposite extremities of all the wires remain unconnected, the portions between the sliders and these extremities being unused in any particular setting of the sliders. It will be noted that by the arrangement just described M and N are made independently variable. The computation of the value of X can thereby be simplified by setting the N slider at such a distance from 17 that its length makes a convenient numerical divisor, and varying the position of the M slider until the bridge is balanced, i. e., until no current flows through the galvanometer. In fact, computation may be entirely eliminated by setting the N slider at a distance from 17 numerically equal to the ohmic value of R, whereby when the bridge is balanced, $X=M$.

A convenient instrument for carrying out my invention is shown in Figure 4. The wires 11, 12, 13 and 14 are here shown in the form of ribbons. I prefer to use ribbons instead of circular wires for the reason that I have discovered that better contact can be obtained between them and the sliders. This is of especial importance in the present construction where the sliders must make continuous contact with two resistance elements.

The resistance ribbons are mounted upon non-conducting strips 18 and 19. The latter are, in turn mounted upon a base member 20, preferably also of non-conducting material.

The sliders 15 and 16 are each composed of a substantially U-shaped element having channels in the inner sides of its arms adapted to engage the strips 18 or 19, upon which it can slide. Inside the U is fixed a contact element 21 which bridges the two ribbons of each pair. The contact pressure can be regulated by the screw 22.

The adjacent ends of one of each pair of ribbons, in this case 12 and 13, are connected together by the conducting strip 17, upon which is mounted a binding post 23, which permits convenient connection of the galvanometer. The corresponding ends of ribbons 11 and 14 are fixed to short conducting strips 24 and 25 respectively, upon which are mounted the binding posts 26 and 27 respectively, which permit of the convenient connection of the battery and the resistances X and R. It will be understood that the resistances X and R in no way form any part of the present apparatus, X being any unknown resistance which the user of the apparatus desires to measure and R being any resistance element whose magnitude is known. The conducting strips 17, 24 and 25 are mounted upon a sheet of non-conducting material 29 of the same thickness as the strips 18 and 19, which is likewise fastened to the base 20. A fourth binding post 28 is provided on the member 29 for the connection of the other terminal of the galvanometer and the resistances X and R.

Since the four terminals of the bridge are very close together, errors due to external lead resistance are substantially eliminated. Furthermore, the arrangement of the terminals at the corners of a diamond is of considerable assistance in educational work. In order still further to enhance this feature of the present invention, the conventional Wheatstone bridge diagram may be engraved upon the member 29 in proper relationship to the terminals 17, 26, 27 and 28 as shown in Figure 4. It is to be noted that these indicia upon the element 29 do not relate to hidden wiring in the apparatus, but are merely for the purpose of indicating to the student how the present device should be connected with the other elements necessary to form the well-known Wheatstone bridge circuit.

The distances of the sliders from the binding post ends of the ribbons is indicated by suitable scales affixed to the strips 18 and 19 between the two ribbons mounted thereon. These scales are divided into equal divisions, preferably one hundred in number, the one hundredth division being placed at the extreme slider position.

Instead of disposing the two pairs of ribbons parallel to each other as shown in Figure 4, they may be placed end to end without sacrificing the advantage of short external connecting leads; the length of the instrument will, however, be doubled.

On the other hand, should it be desired to increase the resistance of the elements M and N without increasing the length of the instrument, this can be accomplished by employing four pairs of ribbons with a slider on each pair. In this case both M and N will comprise two series-connected pairs of ribbons.

A modification of the latter arrangement is shown diagrammatically in Figure 5. Here the resistances X and R are replaced by conducting strips 30 and 31. The four pairs of ribbons are indicated by A, B, C, and D. This arrangement is especially useful as an electrical slide rule or computing device, since when the galvanometer shows zero current, the slider positions will be in the proportion $A/D=B/C$ or $AC=BD$. Thus to carry out division, the D slider may be set at 1, 10 or 100; B at the dividend; C at the divisor; whereupon, if the A slider be positioned to give zero current through the galvanometer, A will indicate the quotient, having due regard to the position of the decimal point as indicated by D. Multiplication, involution and evolution can likewise be carried out with this apparatus as will be evident to those skilled in the art. Moreover, the apparatus can also be used for the study of voltage and current relations if desired.

Having now described my invention, I claim:

1. A Wheatstone bridge device comprising a base member having mounted thereon two independently variable resistance elements each comprising two similar parallel resistance wires with connection terminals at one pair only of adjacent ends and slider means adapted to interconnect said wires at any desired opposite points along their length.

2. A Wheatstone bridge device comprising a base member having mounted thereon two resistance elements including four resistance wires disposed parallel and in close proximity to each other, slider means for interconnecting the first and second wires at any desired opposite points along their lengths, additional independently movable slider means for interconnecting the third and fourth wires at any desired opposite points along their lengths and means of low resistance for connecting one pair of ends of the second and third wires.

3. A Wheatstone bridge device comprising a base member; a plurality of resistance elements mounted thereon, each comprising a pair of similar parallelly disposed resistance wires; a plurality of sliders, one for each element, adapted to be moved along said element and to interconnect the two wires thereof at definite equal distances from adjacent ends, all of said sliders being independently movable; and scale means for indicating the positions of said sliders with respect to the adjacent ends of the several elements.

4. A Wheatstone bridge device including four similar variable resistance elements, a galvanometer, a battery, and means for connecting the same in a Wheatstone bridge circuit, each of said resistance elements comprising a pair of similar parallelly disposed resistance wires, slider means movable along said wires for interconnecting them at any definite distance from adjacent ends and scale means associated with each element for indicating the ratios of the elements to each other for any given set of slider positions.

5. A Wheatstone bridge device comprising a base member, two resistance elements mounted thereon with one pair of ends thereof in proximity to each other at one end of said base, each comprising a pair of similar parallelly disposed resistance wires and a slider adapted to connect the two wires at any desired opposite points along their lengths, a plurality of binding posts for making connection to the adjacent ends of said wires, and scale means for indicating the positions of said sliders from the said ends of the wires.

6. A Wheatstone bridge device for educational purposes comprising a base member, two resistance elements forming bridge ratio arms mounted thereon, said elements together comprising four similar straight resistance wires positioned in close proximity and parallel to each other, slider means for interconnecting the first and second wires at any desired opposite points along their lengths, a second independently movable slider means for interconnecting the third and fourth wires at any desired opposite points along their lengths, means of low resistance mounted on said base for connecting the adjacent ends of the second and third wires and having a connection terminal mounted thereon, two connection terminals mounted on the base each being connected to one of the corresponding adjacent ends of said first and fourth wires and a fourth connection terminal mounted on said base independently of said resistance elements, said four terminals being positioned on said base at the four corners of a diamond.

FRANK H. BROOME.